United States Patent [19]

Grüü ü ä

[11] 4,282,058
[45] Aug. 4, 1981

[54] APPARATUS FOR THERMAL TREATMENT OF FLOWABLE MATERIALS

[75] Inventors: Johann Grüter; Heinz Märki, both of Zürich, Switzerland

[73] Assignee: Luwa AG, Zürich, Switzerland

[21] Appl. No.: 143,279

[22] Filed: Apr. 24, 1980

[30] Foreign Application Priority Data

May 3, 1979 [CH] Switzerland ............... 137/79
May 3, 1979 [CH] Switzerland ............... 138/79

[51] Int. Cl.³ ........................................... B01D 1/24
[52] U.S. Cl. ................................. 159/13 R; 159/14; 159/27 R; 202/236; 202/187
[58] Field of Search ................ 159/13 B, 13 R, 13 A, 159/13 C, 14, 6 W, 27 R; 202/236, 187; 203/87

[56] References Cited
U.S. PATENT DOCUMENTS

| | | | |
|---|---|---|---|
| 894,407 | 7/1908 | Suzuki | 159/13 B |
| 1,567,455 | 12/1925 | Newton | 159/13 R |
| 3,090,732 | 5/1963 | Pinkwart et al. | 202/187 |
| 3,292,683 | 12/1966 | Buchi et al. | 202/236 |

*Primary Examiner*—Norman Yudkoff
*Attorney, Agent, or Firm*—Werner W. Kleeman

[57] ABSTRACT

Internally of an insert arranged within a container there is disposed a pre-evaporator, which at its lower end has an inlet for the starting material and at its upper end opens into a treatment compartment or chamber. The pre-evaporator is surrounded by a heating jacket whose outer surface serves as a heated treatment wall. For forming a thin layer there coact, with such treatment wall, up and down movable wiper elements. Arranged coaxially with respect to the insert or insert member, within the container, is a surface condenser. The starting material or product which is to be processed, is pre-evaporated within the pre-evaporator and subjected, along the treatment wall, to a final evaporation. The lighter volatile constituents condense at the surface condenser, and the condensate can be separately outfed from the concentrate which is formed during the final evaporation.

16 Claims, 4 Drawing Figures

APPARATUS FOR THERMAL TREATMENT OF FLOWABLE MATERIALS

BACKGROUND OF THE INVENTION

The present invention relates to a new and improved construction of apparatus for the thermal treatment of fluent or flowable materials.

Generally speaking, the apparatus of the present development is of the type comprising at least one essentially vertical insert or insert member arranged within a treatment compartment or chamber. The insert member is provided at its outer surface with a treatment wall and contains a translatorily up-and-down movable treatment element. The treatment element is provided with at least one wiper or spreader element which coacts with the treatment wall for forming a thin film.

With a heretofore known apparatus of this type the material which is to be thermally processed and infed from the outside into the treatment compartment or chamber, is applied to the upper end of the insert member at the treatment wall and flows along such treatment wall in the downward direction. Relevant in this regard is Swiss Pat. No. 482,161 and U.S. Pat. No. 3,590,916, granted July 6, 1971. The material is exposed to the action of up-and-down moving wiper or spreader elements, which, in turn, serve for conveying and, on the other hand, for the spreading of the material. Hence, the material is intensively admixed and circulated, resulting in an improved thermal transfer or treatment.

SUMMARY OF THE INVENTION

It is a primary object of the present invention to provide a new and improved construction of apparatus for the thermal treatment of flowable materials, possessing a relatively compact construction and affording a protective thermal treatment of the most different starting materials or products.

Yet a further significant object of the present invention aims at a new and improved construction of apparatus for the thermal treatment of fluent or flowable materials, which apparatus is relatively simple in construction and design, economical to manufacture, extremely reliable in operation, not readily subject to breakdown or malfunction, and requires a minimum of maintenance and servicing.

Now in order to implement these and still further objects of the invention, which will become more readily apparent as the description proceeds, the thermal treatment apparatus of the present development is manifested by the features that internally of the insert member there is arranged a pre-evaporator unit for the starting material or product which is to be processed, the pre-evaporator unit opening into the treatment compartment or chamber.

The starting material or product which is to be treated is subjected to pre-heating and pre-evaporation, prior to its application upon the treatment wall, these operations occurring in a most space saving fashion within the insert member.

Preferably, the pre-evaporator unit is surrounded by a heating shell or jacket, the outer wall of which forms the treatment wall. Due to the mutual bounding or interfacing of the heating jacket and the pre-evaporator unit there is rendered possible maximum utilization of the infed thermal energy or heat.

According to a preferred construction of the invention, the treatment element is surrounded by a condenser, whose condensate collection chamber is separated from the product outlet. In this condenser there condense the easily volatile constituents which are separated-out during the pre-evaporation and final evaporation, so that the condensate can be separately withdrawn from the concentrate which remains during the final evaporation.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 illustrates a further construction of thin film apparatus according to the invention.

DETAILED DESCRIPTION OF THE PREFERRED EMBODIMENTS

Figure 1:
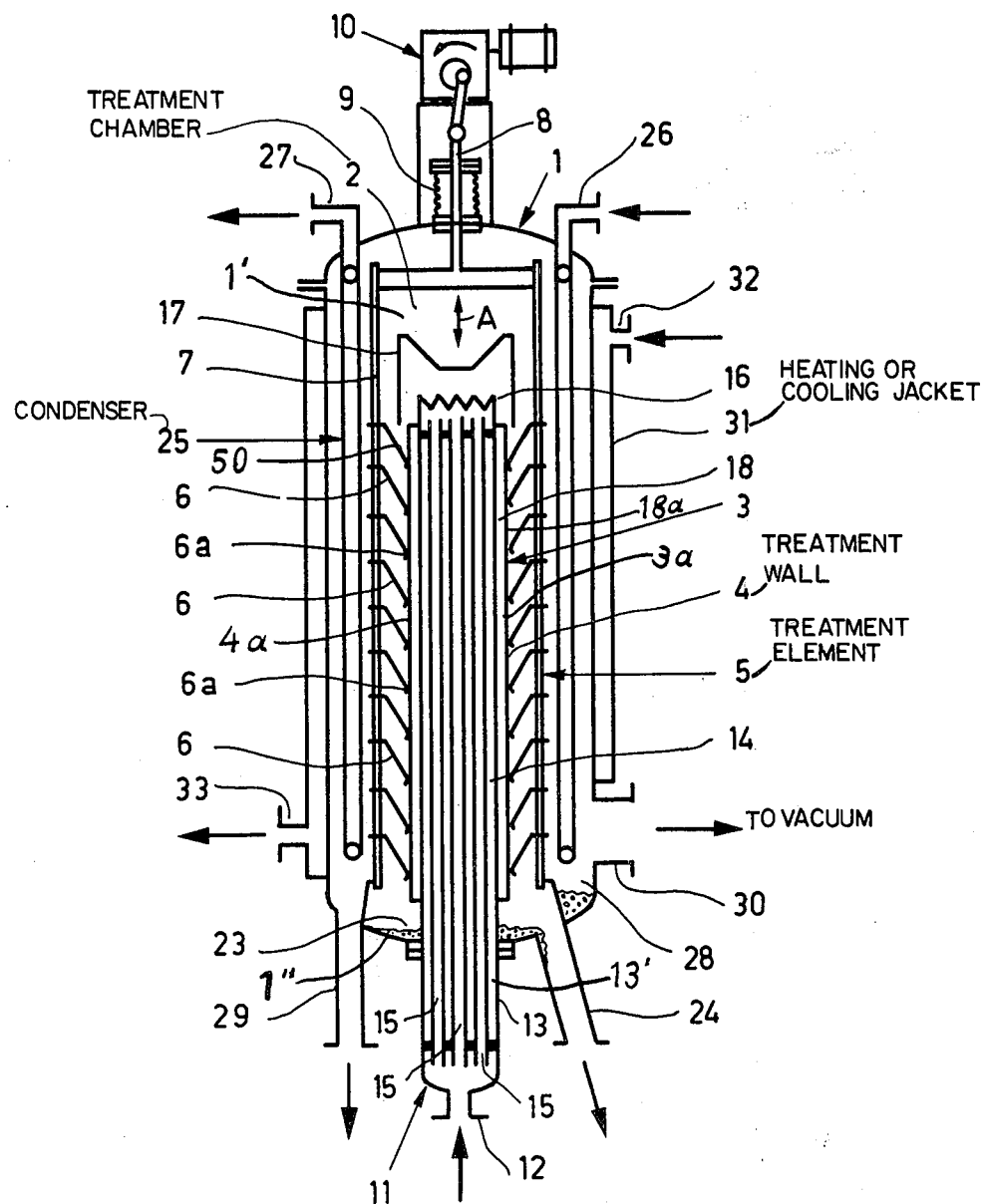
FIG. 1 schematically illustrates a first embodiment of an apparatus for the thermal treatment of flowable materials, commonly referred to as a thin film apparatus.

Describing now the drawings, it is to be understood that throughout the various embodiments of apparatus for the thermal treatment of flowable or fluent materials, there have been conveniently used throughout the various Figures the essentially same reference characters to denote the same or analogous elements and in FIG. 4 there has been used a prime marking adjacent such reference characters for certain of the modified structure thereof. The thermal treatment apparatus, commonly designated in the art as a thin film apparatus, will be seen to comprise an upright container or housing 1, whose internal space or interior 1' constitutes a treatment chamber or compartment 2. Arranged within this treatment compartment or chamber 2 is a vertical axis, substantially cylindrical insert or insert member 3, the outer wall 3a of which serves as a treatment wall 4. This treatment wall 4 is constituted by the outer shell or jacket 4a of a right circular cylinder. In order to form a thin film or layer a treatment element 5 coacts with this treatment wall 4. The treatment element 5 can be moved up-and-down, in the direction of the arrow A of FIG. 1, as will be more fully explained hereinafter. This treatment element or assemblage 5, as has been clearly disclosed in the aforementioned Swiss Pat. No. 482,161 and U.S. Pat. No. 3,590,916, to which reference may be readily had and the disclosures of which are incorporated herein by reference, contains a number of wiper or spreader elements 6 arranged at a mutual spacing from one another and encircling the treatment wall 4. The working edges 6a of these wiper or spreader elements 6 extend such as to have a slight spacing from the treatment wall 4 and form together therewith a gap; however, it would be possible, under circumstances, for such wiper elements 6 to physically contact the treatment wall 4 by means of their working edges 6a. These wiper or spreader-working edges 6a extend along the jacket surface, generally indicated by reference character 50, of a second circular cylinder which is essentially coaxially dispositioned with respect to the circular cylinder formed by the treatment wall 4. The wiper or spreader elements 6 are secured to a holder means or holder element 7 which is connected with a shaft 8. This shaft 8 leads out of the container or housing 1, through a bellows 9 or equivalent structure and is operatively connected with a suitable drive 10, here shown as a crank drive. The drive means 10 imparts to the shaft 8, and thus, equally to the spreader or wiper elements 6 an up-and-down movement in the direction of the double-headed arrow A.

Internally of the insert or insert member 3 there is arranged a pre-evaporator or pre-evaporator unit 11. This pre-evaporator 11 contains a conduit or tube 13 which is provided at its lower end with an inlet or inlet means 12 and extends through the base or floor 1" of the container or housing 1. The interior or internal space 13' of this tube or conduit 13 serves as a heating compartment or chamber 14, through which extend a number of essentially vertical pipes or tubular elements 15, which at their lower end are in flow communication with the inlet means 12 for the infeed of the starting product or material which is to be processed and at their upper ends open into the treatment compartment or chamber 2. The outer tube or conduit 13 of the pre-evaporator 11 will be seen to be equipped at its upper edge with a serrated or zig-zag configured overflow edge portion or edge means 16. This overflow edge means 16 serves to distribute the outflowing liquid uniformly over the entire circumference of the treatment wall 4. Above the pre-evaporator 11 there is arranged a separator 17. The outer conduit or tube 13 of the pre-evaporator 11 is surrounded by a heating jacket or shell 18, the outer wall 18a of which forms the treatment wall 4.

Figure 2:
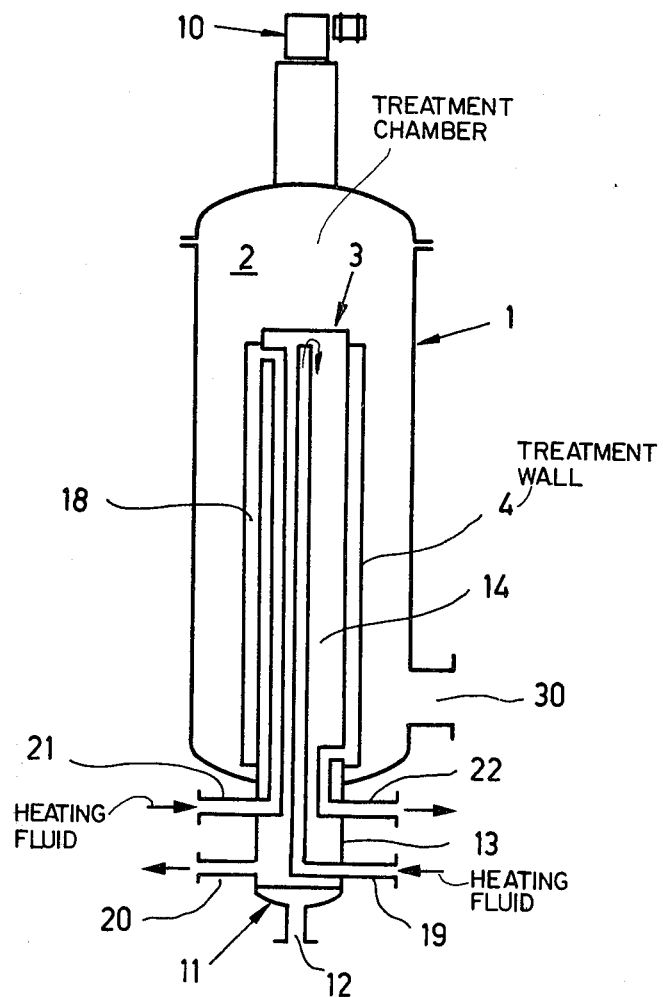
FIG. 2 illustrates details of the heating system of the thin film apparatus of FIG. 1.

A particularly advantageous construction of heating system which can be used with the pre-evaporator or pre-evaporator unit 11 and the treatment wall 4 has been shown schematically in FIG. 2, wherein for the sake of improving the clarity of illustration and comprehensibility of the drawing the remaining components of the thin film apparatus, otherwise shown in FIG. 1, have been here omitted. For the infeed of the vaporous or liquid heating medium into the heating chamber or compartment 14 of the pre-evaporator 11 there is conveniently provided an infeed line or conduit 19. For the return flow of the fluid heating medium there is connected with the heating compartment or chamber 14 and outlet stud or connection 20. The infeed line or conduit 21, serving for the infeed of the heating medium to the heating shell or jacket 18, likewise is guided through the interior 13' of the outer tube or conduit 13 of the pre-evaporator 11. An outlet connection or stud 22 or equivalent structure, operatively connected with the heating jacket or shell 18, is provided for the purpose of return feed of the heating medium. The heating of the tubes or pipes 15 of the pre-evaporator 11 is therefore accomplished independently of the heating of the treatment wall 4. Therefore, the heating medium for the pre-evaporation can be infed to the heating chamber or compartment 14 at a different pressure and at a different temperature than the pressure and temperature of the heating medium used for heating the treatment wall 4. Since the heating jacket 18 directly bounds at the heating chamber 14 of the pre-evaporator 11, it is possible to optimumly utilize the infed thermal energy or heat. A thermal insulation of both heating systems, within the insert member 3, therefore is not required.

At the floor or base 1" of the container or housing 1 there is located a collecting chamber or compartment 23 for collecting the concentrate which remains during the final or end evaporation. The concentrate within the collecting compartment or chamber 23 can be withdrawn by means of an outlet stud or connection 24 or equivalent structure.

Arranged coaxially with respect to the insert member 3 and the treatment element 5 and at a certain encircling spacing therefrom, is a surface condenser 25. This surface condenser 25 is located within the container or housing 1 and possesses an inlet connection or stud 26 and an outlet connection or stud 27 or equivalent structure. Below the condenser 25 there is arranged a condensate collecting chamber or compartment 28 which is separated from the concentrate collecting chamber 23. This condensate collecting chamber or compartment 28 can be emptied by means of a connection stud or connection 29 or equivalent structure. Hence, the condensate can be separated from the concentrate.

The container 1 is furthermore provided with a connection or stud 30 at which there can be coupled a conventional vacuum pump, which is here not further shown. For heating or cooling the container or housing 1 the latter is surrounded by a suitable heat exchanger i.e., heating or cooling jacket or shell 31, to which there is infed, as the case may be, the heating or cooling medium by means of an inlet 32 and can be withdrawn by means of an outlet 33.

Having now had the benefit of the description of the thin film apparatus of the invention its mode of operation will be considered and is as follows:

The starting product or material, entering the pre-evaporator 11 by means of the inlet 12, moves into the tubes or pipes 15 and is initially brought to the boiling temperature by the heating medium located within the heating chamber or compartment 14. Therefore, the starting material or product initially experiences a pre-heating. After attaining the boiling temperature there are formed vapor bubbles which upwardly convey the liquid product with increasing velocity. By means of the heating medium there is also infed further heat or thermal energy to the ascending product or material. Hence, there occurs a pre-evaporation, and under certain conditions there can be formed a so-to-speak "climbing film". The vapor-liquid mixture which effluxes out of the pre-evaporator 11 is then separated at the separator or separator means 17, and the liquid, under the action of the serrated edge means 16, is distributed over the entire circumference of the treatment wall 4.

The up-and-down moved spreader or wiper elements 6 now distribute the pre-concentrated product along the treatment wall 4, in the manner as the same has been fully explained in the previously mentioned Swiss Pat. No. 482,161 and U.S. Pat. No. 3,590,916. Along the treatment wall 4 the material or product continuously is operatively coacted upon by the wiper or spreader elements 6, which dam-up the product, admix the same, newly distribute and commingle or redeposit the same. In this way there is formed a thin film, and there is effectively prevented that the treated product or material can flow downwardly in an uncontrolled fashion. The formed concentrate arrives at the collecting chamber or compartment 23 and can be withdrawn by means of the outlet stud or connection means 24. As best recognized by reverting again to FIG. 2, the treatment wall 4 is heated by the heating medium which circulates in the heating jacket or shell 18.

The lighter volatile constituents, separated out during the pre-evaporation and final evaporation, condense at the surface condenser 25 and collect in the form of condensate within the collecting chamber or compartment 28. From the location of the collecting chamber 28 the condensate can be withdrawn, separately from the concentrate, by means of the outlet connection 29.

In the described thin film apparatus there thus initially occurs a pre-heating of the starting product or material, which thereafter is subjected to a pre-evaporation, whereupon there is accmplished the final or terminal evaporation. The evaporation proceeds continuously and usually in a throughflow process. The residence time of the product within the equipment is brief and there is effectively precluded any overheating, especially during the final evaporation phase. Due to the up-and-down moving wiper or spreader elements 6 the treatment wall 4 is maintained clean.

Figure 3:
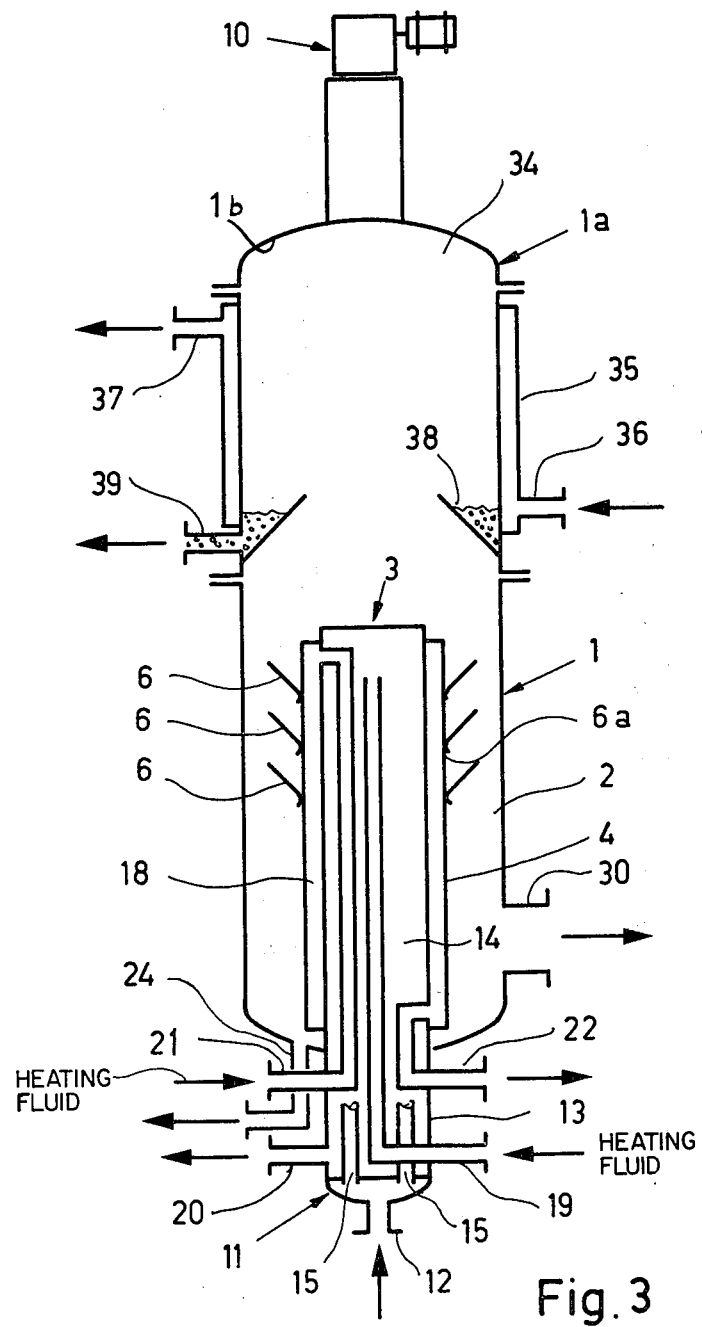
FIG. 3 illustrates a further construction of thin film apparatus according to the invention, the illustration being like the showing of FIG. 1.

Continuing, in FIG. 3 there is shown a further construction of thin film apparatus, the illustration being a vertical schematic sectional view like the showing of the embodiment of FIGS. 1 and 2. With this modified version of equipment there is additionally provided, apart from the not particularly illustrated components of the thin film apparatus which were discussed above in conjunction with FIGS. 1 and 2, a further condensation chamber or compartment 34 arranged at the upper portion 1a of the container or housing 1. This additional condensation chamber 34 is surrounded by a cooling jacket 35. The cooling medium is infed by means of an infeed stud or connection 36 and departs from the cooling jacket or shell 35 by means of an outlet connection or stud 37. The condensate which deposits upon the inner wall 1b of the container or housing upper portion 1a, is collected in a condensate collecting chamber or compartment 38 which is provided with an outflow connection or stud 39 or equivalent structure.

The mode of operation of the apparatus shown in FIG. 3, which is suitable for the separation of triple component materials, esentially corresponds to the mode of operation already previously described in conjunction with the embodiment of thin film apparatus as discussed during consideration of FIGS. 1 and 2. The light volatile constituents of the starting material or product condense in the condensation chamber or compartment 34, from which there can be withdrawn, by means of the connection or stud means 39, the condensate. The intermediate heavy constituents condense at the surface condenser 25 and are withdrawn via the connection or stud means 29 (FIG. 1), whereas the concentrate remaining during the evaporation process, is collected in the concentrate collecting chamber or compartment 23 and outfed by means of the connection stud 24 or equivalent structure (FIG. 1).

The apparatus shown in FIG. 3 is particularly suitable, for instance, for the recycling of lubricant oil, whereas the embodiment of FIGS. 1 and 2, among other things, is suitable for use for reclaiming solvent and for squeezing out distillation residues and also can be beneficially employed as a short path evaporator.

As already mentioned, the treatment wall 4 is formed by the jacket or outer surface 4a of a cylinder, whereas the working edges 6a of the wiper or spreader elements 6 extend along the outer surface 50 of a further cylinder which is essentially coaxially arranged with respect to the first cylinder. However, as shown in FIG. 4 it is also possible to design the treatment wall 4 as a jacket surface of a preferably right circular cone or a truncated circular cone, and in this case the working edges 6a' of the wiper or spreader elements 6' extend along the outer jacket surface of a second coaxial, preferably likewise right cone 60 or truncated cone. Both of the cones or truncated cones can have the same or different aperture angles $\beta$ and $\gamma$ and either diverge towards the bottom or towards the top.

With such type conical construction of the treatment wall 4 and the treatment element 5 is is possible to alter the position of the wiper or spreader elements 6' with respect to the treatment wall 4, as indicated by the wiper element 6'', by changing the elevational position of the treatment element 5, with the result that there can be varied the width of the gap between the working edges 6a' and the treatment wall 4, and thus, there can be varied the thickness of the thin film and there can be, in turn, affected the residence time.

According to a further construction of this type, during the translatory movement of the treatment element 5, there is continuously changed the width of the gap between the working edges 6a' of the wiper or spreader elements 6' and the treatment wall 4. The material which migrates downwardly therefore must pass through a gap which alternately constricts and enlarges. This, in turn, increases the turbulence within the thin film, so that there is augmented the material and heat transfer.

If the aperture angle $\beta$ of the circular truncated cone, formed by the treatment wall 4, is chosen so as to be different than the aperture angle $\gamma$ of the circular truncated cone which is defined by the working edges 6a' of the wiper or spreader elements 6', then there can be attained the result that the width of the working gap, and thus, the thickness of the thin film changes in the throughpass direction of the material.

Moreover, it is possible to arrange within the same container or housing 1 a number of inserts or insert members 3, wherein each may be similarly constructed as the insert members illustrated in the arrangements of FIGS. 1, 2 and 3 and coacts with its own treatment element 5.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. An apparatus for the thermal treatment of flowable materials comprising:
   means defining a treatment compartment;
   an essentially vertically dispositioned insert member arranged in said treatment compartment;
   said insert member having an outer surface constituting a treatment wall;
   a translatorily up-and-down movable treatment element cooperating with said treatment wall;
   said treatment element comprising at least one spreader element which coacts with the treatment wall for forming a thin film;
   pre-evaporator means for a starting product to be treated and arranged internally of said insert member; and
   said pre-evaporator means opening into said treatment compartment.

2. The apparatus as defined in claim 1, wherein:

said pre-evaporator means comprises at least one tube means having an upper portion and a lower portion;

means defining an inlet for the starting product arranged at the lower region of said tube means;

means defining an outlet arranged at the upper region of said tube means and opening into said treatment compartment;

said pre-evaporator means containing a heating compartment through which flows a heating medium; and said at least one tube means extending through said heating compartment.

3. The apparatus as defined in claim 2, further including:

an additional heating compartment surrounding said pre-evaporator means; and said additional heating compartment containing an outer wall defined by said treatment wall.

4. The apparatus as defined in claim 1, further including:

condenser means surrounding said treatment element;

said treatment compartment being provided with product outlet means;

said condenser means being provided with a condensate collecting chamber which is separated from said product outlet means.

5. The apparatus as defined in claim 4, wherein:

said means defining said treatment compartment comprises container means confining therewithin said treatment compartment;

said container means including a container portion located above said insert member and which defines a condensation chamber having a condensate collecting space which is separated from the condensate collecting chamber of the condenser means surrounding said treatment element.

6. The apparatus as defined in claim 1, further including:

a plurality of said insert members arranged within said treatment compartment and each possessing a treatment wall; and each said insert member coacting with a treatment element.

7. The apparatus as defined in claim 1, wherein:

said treatment wall is defined by the jacket surface of a first cylinder.

8. The apparatus as defined in claim 7, wherein:

said cylinder comprises a right cylinder.

9. The apparatus as defined in claim 1, wherein:

said treatment wall is defined by the jacket surface of a first cone.

10. The apparatus as defined in claim 9, wherein:

said cone is a right cone.

11. The apparatus as defined in claim 7, wherein:

said treatment element comprises a plurality of spreader elements arranged at a mutual spacing from one another;

each of said spreader elements having working edges; and said working edges neighboring said treatment wall and extending along a jacket surface of a second cylinder which extends substantially coaxially with respect to said first cylinder defining the treatment wall.

12. The apparatus as defined in claim 11, wherein:

said second cylinder comprises a right cylinder.

13. The apparatus as defined in claim 9, further including:

a plurality of spreader elements arranged at a mutual spacing from one another;

said spreader elements having working edges neighboring said treatment wall;

said working edges of said spreader elements extending along the jacket surface of a second cone which is arranged substantially coaxially with respect to the first cone defining said treatment wall.

14. The apparatus as defined in claim 13, wherein:

said second cone comprises a right cone.

15. The apparatus as defined in claim 13, wherein:

said first and second cones possess essentially the same aperture angle.

16. The apparatus as defined in claim 13, wherein:

said first and second cones possess different aperture angles.

* * * * *